May 10, 1949.  W. G. LUNDQUIST  2,469,439
GAS TURBINE
Filed Nov. 24, 1944  3 Sheets-Sheet 2
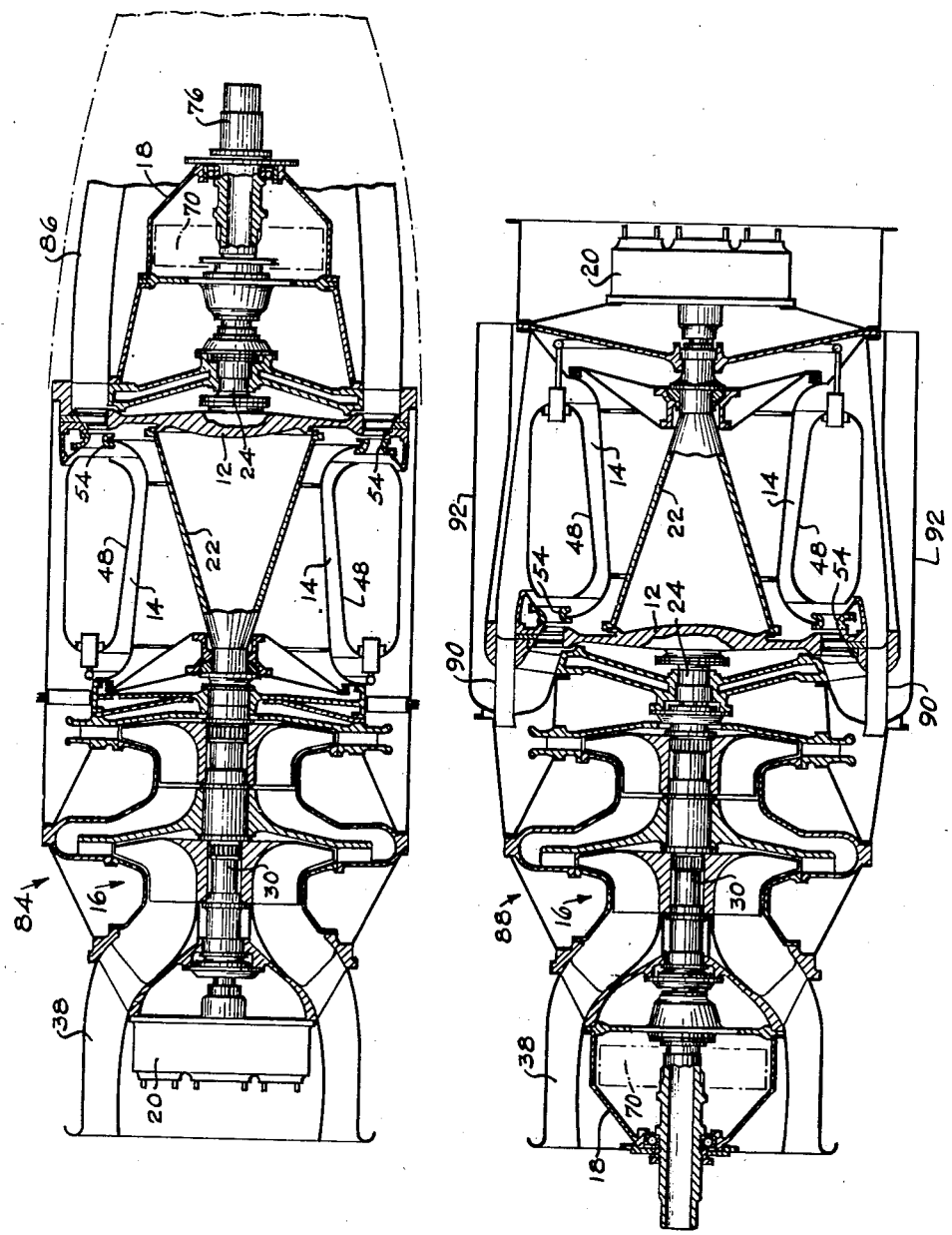
INVENTOR.
WILTON G. LUNDQUIST.
BY
ATTORNEY

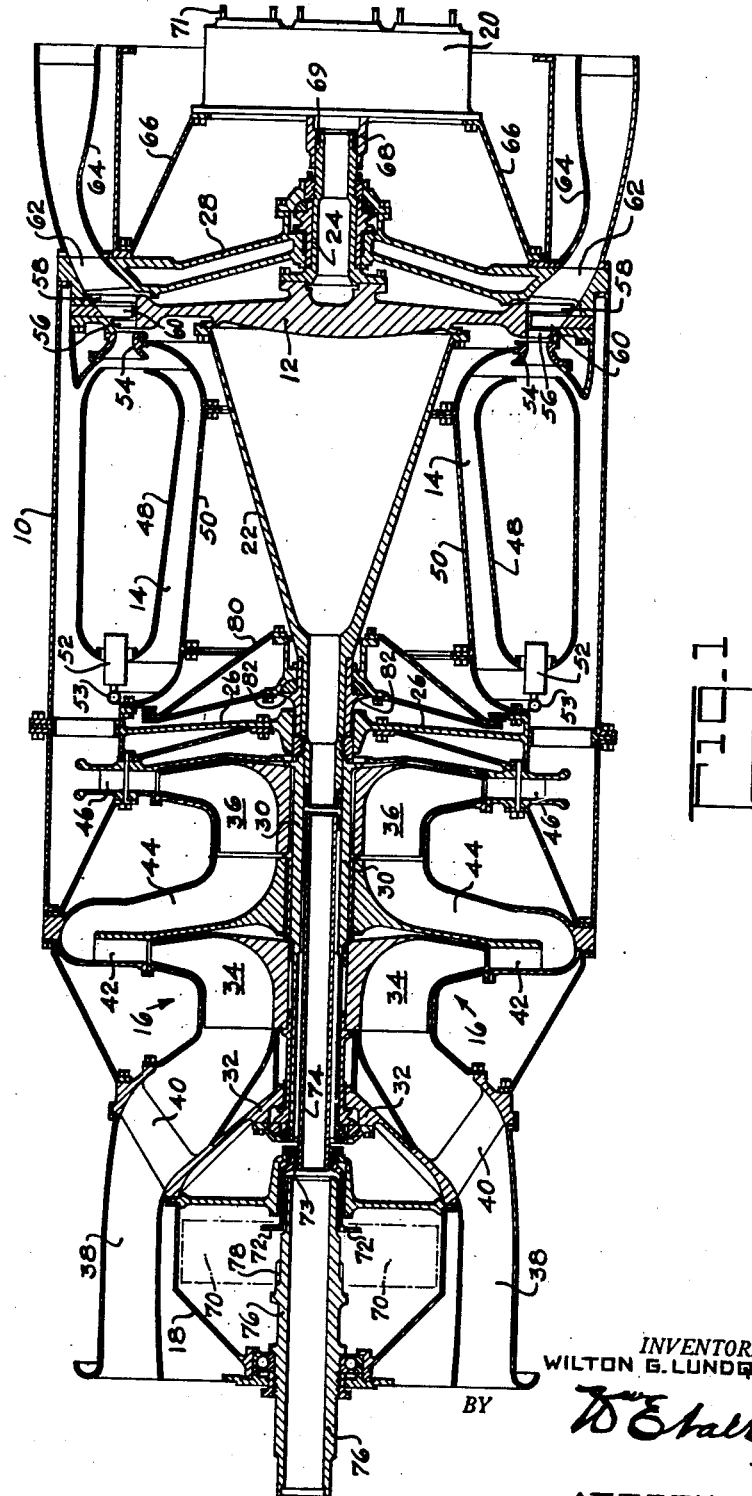

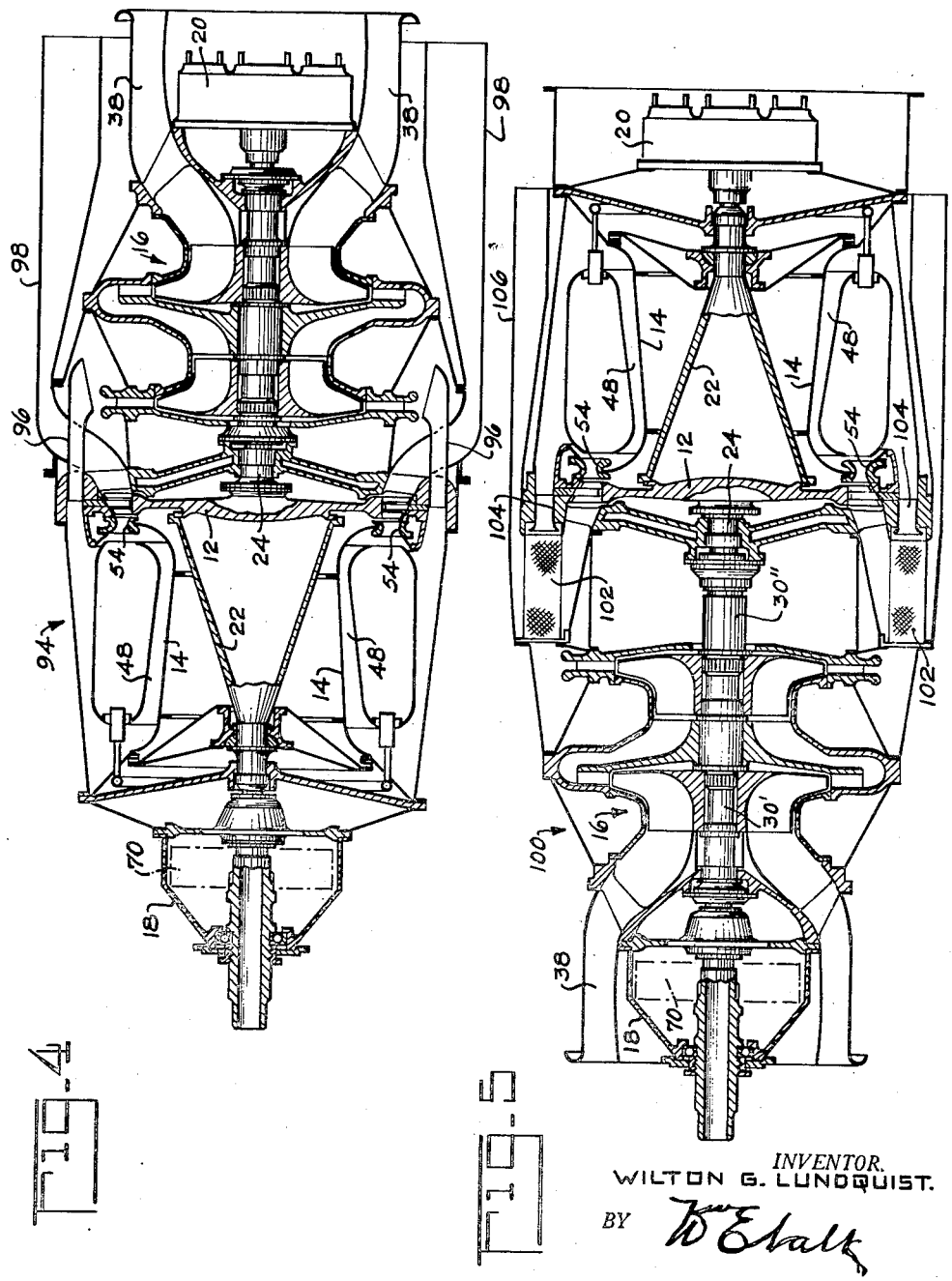

Patented May 10, 1949

2,469,439

UNITED STATES PATENT OFFICE 2,469,439

GAS TURBINE

Wilton G. Lundquist, Hohokus, N. J., assignor to Wright Aeronautical Corporation, a corporation of New York Application November 24, 1944, Serial No. 565,019

1 Claim. (Cl. 60—41)

This invention relates to gas turbines and is particularly directed to a gas turbine power plant for use with aircraft.

A gas turbine power plant for aircraft may comprise a combustion chamber, a turbine driven by the combustion gas, a compressor driven by the turbine for compressing the air supplied to the combustion chamber, an aircraft propeller reduction gear unit drivably connected to the turbine and an auxiliary unit driven by the turbine comprising drives for various auxiliary equipment. It is an object of this invention to so construct these basic gas turbine power plant components and the driving connections therefor that the power plant is adapted to be assembled with these basic components occupying the various relative positions. For example, with the present invention a tractor propeller aircraft installation, in which the propeller reduction gear unit is disposed at the front end of the power plant and the auxiliary drive unit is disposed at the rear end of the power plant, may readily be converted to a pusher propeller aircraft installation by interchanging the positions of the propeller drive reduction gear unit and the auxiliary drive unit. Similarly, the air compressor may be mounted at either end of the power plant and the relative positions of the combustion chamber and turbine may be interchanged. Thus, the same basic turbine components may be assembled in the relative positions best suited for the particular turbine power plant installation.

Other objects of this invention will become apparent upon reading the annexed detailed description in connection with the drawing in which:

Figure 1 is an axial section through a tractor propeller gas turbine installation;

Figure 2 is a view similar to Figure 1 but of a pusher propeller installation and to a reduced scale;

Figure 3 is an axial section of a tractor propeller gas turbine installation similar to Figure 1 but to a reduced scale and with the positions of the combustion chamber and turbine interchanged;

Figure 4 is an axial section through a tractor propeller gas turbine installation similar to Figure 1 but to a reduced scale and with the compressor disposed at the rear of the power plant and, Figure 5 is a modification of Figure 3.

Referring first to Figure 1, a gas turbine power plant for aircraft is illustrated as comprising an outer casing 10 within which are supported a turbine unit 12, an annular combustion unit 14, a two-stage centrifugal compressor unit 16, a propeller drive reduction gear unit within a housing 18 and an auxiliary drive unit within a housing 20 comprising drives for various auxiliary equipment.

The turbine unit 12 comprises a turbine rotor having a pair of co-axial shafts 22 and 24 drivably connected to opposite sides thereof and journaled within supporting diaphragms 26 and 28 extending across the casing 10. The shaft 22 is splined to one end of a compressor drive shaft 30, the other end of which is journaled within a supporting diaphragm 32 extending transversely across the casing 10.

The air compressor unit 16 comprises a pair of axially spaced centrifugal impellers 34 and 36 drivably mounted on the shaft 30. The impeller 34 is provided with an annular intake duct 38 across which extend webs 40 disposed at the outer edge of the supporting diaphragm 32. The air compressed by the impeller 34 discharges into an annular diffuser chamber 42 and thence through an annular intake duct 44 to the impeller 36. The impeller 36 further compresses the air which it discharges into an annular diffuser chamber 46 from which the compressed air discharges into the combustion unit 14. The combustion unit 14 comprises an annular combustion chamber 48 disposed in an annular space defined by the power plant casing 10 and an inner annular shell 50 disposed about the shaft 22 and supported at its ends by the diaphragms 26 and 28. The annular combustion chamber 48 is provided at one end with a plurality of circumferentially spaced fuel discharge nozzles 52 connected to a fuel distributing manifold 53.

From the combustion chamber 48, the combustion gases enter an annular turbine nozzle 54 supported by the transverse diaphragm 28. The annular nozzle 54 is provided with suitable guide vanes for directing the combustion gases against the blades of the turbine wheel 12. The turbine wheel is provided with one or more sets of blades disposed about its periphery. As illustrated, the turbine wheel is provided with two sets of blades 56 and 58 and between which sets of blades is disposed a set of fixed blades 60 supported by the diaphragm 28. The supporting diaphragm 28 is provided with an annular opening, the walls of which are connected by webs 62, and to which opening an annular exhaust duct 64 is secured. After expansion through the turbine blades, the combustion gases discharge rearwardly through the exhaust duct 64 into the surrounding air stream to provide a forward jet propulsive thrust.

An annular flange 66 supported by the diaphragm 28 provides a mounting pad for the auxiliary drive unit 20. The unit 20 comprises a drive shaft 68 having splines 69 drivably engaging complementary splines on the end of the turbine shaft 24, and a plurality of individual shafts (not shown) are drivably connected to the shaft 68 to provide drives for various turbine auxiliary equipment. The auxiliary unit 20 is provided with suitable mounting studs 71 for such auxiliary equipment. A mounting pad, similar to that formed by the flange 66, is provided by the diaphragm 32 within the space surrounded by the annular intake duct 38 and upon which the reduction gear unit 18 is supported. The reduction gear within the unit 18 is indicated by the dashed outline 70 and may be of any conventional construction. The reduction gear 70 is provided with a drive shaft 72 having splines 73 which are drivably meshed with complementary splines on one end of an intermediate shaft 74. The other end of the intermediate shaft 74 is splined to the impeller drive shaft 30 adjacent the end of the turbine shaft 22. The reduction gear 70 is drivably connected to a propeller shaft 76 which is provided with splines 78 for this purpose.

With this construction, the air compressor 16 is driven by the turbine and takes in air through the annular duct 38 and supplies compressed air to the combustion chamber 48 from which the combustion gases are discharged through an annular turbine nozzle 54 and thence against the turbine blades and out through the exhaust duct 64. The combustion gases subject the turbine wheel to an axial thrust to the right, as viewed in Figure 1, and a balance piston 80 is provided to at least partially balance this axial thrust. The outer periphery of the balance piston 80 is flexibly secured to the casing diaphragm 26 while its inner periphery is disposed about the shaft 22 against a thrust flange 82. The facing surfaces of the turbine wheel and balance piston are both subjected to the same combustion gas pressure and therefore, the balance piston is urged against the thrust flange 82 on the turbine shaft 22 to at least partially balance the thrust acting against the turbine wheel. The structure of this balance piston forms no part of the present invention.

The splines at the ends of the turbine shafts 22 and 24 are similar and therefore either turbine shaft 22 or 24 may be drivably connected to the compressor shaft 30. In addition, the shaft 72 of the reduction gear unit 18 and the auxiliary drive unit shaft 68 are provided with similar splines 73 and 69 respectively and therefore either of these units may be connected to either of the turbine shafts 22 or 24. In this way, the basic components of the gas turbine power plant may be arranged in various relative positions as illustrated in Figures 2 to 4 in which figures parts similar to the corresponding parts of Figure 1 have been designated by similar reference numerals.

Figure 2 discloses a conversion of the tractor propeller installation of Figure 1 to a pusher propeller installation 84. The main components of a power plant 84, namely, the turbine unit 12, combustion unit 14, air compressor unit 16, propeller drive reduction gear unit 18 and the auxiliary unit 20, are similar to the corresponding units of Figure 1, but the relative positions of the propeller drive unit 18 and the auxiliary drive unit 20 have been interchanged. As described in connection with Figure 1, the propeller drive reduction gear unit 18 and the auxiliary unit 20 have similar mounting means and in addition the splines 69 and 73 of other drive shafts 68 and 72 respectively are similar. Therefore, the positions of the units 18 and 20 can readily be interchanged. In addition, as illustrated in Figure 2, the annular combustion gas discharge duct has been modified slightly to provide a more streamlined power plant structure.

Figure 3 illustrates a further modified arrangement of the various turbine power plant components. This modification illustrates a tractor propeller gas turbine power plant 88 which is similar to Figure 1 except that the position of the turbine unit 12 has been reversed relative to the compressor unit 16 and the auxiliary drive unit 20. Thus, the combustion unit 14 is now disposed adjacent the rear of the power plant and it is necessary to provide a plurality of conduits 90 extending over the periphery of the turbine to provide a flow path for the compressed air from the output end of the compressor 16 to the combustion chamber 48 of the combustion unit 14. From the combustion chamber 48, the combustion gases are discharged through the nozzle box 54 and the turbine blades into an annular exhaust conduit 92 which discharges rearwardly into the surrounding air stream. The arrangement of Figure 3 has a diameter somewhat larger than Figure 1. However, with the arrangement of Figure 3 the combustion chamber is mounted at the rear of the power plant and therefore is more readily accessible. Also, by discharging the combustion gases from the central portion of the power plant, it is possible to control the condition of the boundary layer of the air stream over the power plant.

Figure 4 illustrates a further modified arrangement facilitated by the structure described in connection with Figure 1. Figure 4 is similar to Figure 1 except in the power plant 94 there illustrated, the compressor unit has been disposed between the turbine unit 12 and the auxiliary unit 20 instead of between the turbine unit 12 of the propeller drive reduction gear unit 18. That is, in Figure 4, the intake duct 38 of the compressor unit extends and opens rearwardly. The output of the compressor is fed through a plurality of conduits 96 extending across the outer periphery of the turbine to the combustion chamber 48 of the combustion unit 14. From the combustion chamber 48, the exhaust gas is discharged through the annular nozzle 54, the turbine blades, and thence through the annular exhaust conduit 98 into the air stream about the power plant. In Figure 4, the combustion chamber is disposed adjacent the front of the power plant and therefore is readily accessible. Also, in Figure 4, as in Figure 3, the exhaust gases are discharged into the exhaust conduit adjacent the middle of the power plant and there it is possible to use the exhaust gases to control the condition of the boundary layer of the air stream adjacent the power plant.

In a gas turbine power plant, it is also desirable to utilize the exhaust gases to heat the compressed air charge coming from the compressor. In this way, less fuel is required to bring the charge up to the desired operating temperature. The power plant 88 of Figure 3 may readily be modified to a power plant, designated by reference numeral 100 in Figure 5, having a regenerator or heat exchanger utilizing the turbine exhaust gases for heating the compressed air charge coming from the compressor.

The power plant 100 differs from the power plant 88 in that a shaft 30' having an extension portion 30'' has been substituted for the shaft 30. This extension shaft portion 30'' is provided with internal splines drivably engaging the splined end of the turbine shaft 24. In this way, additional space is provided between the compressor unit 16 and the turbine unit 12 for a regenerator or heat exchanger 102. Accordingly in Figure 5, the compressed air charge leaving the compressor passes through the regenerator 102 and conduits 104 to the combustion chamber 48 of the combustion unit 14. In addition, the turbine exhaust gases pass through the regenerator 102 in heat exchange relation with the compressed air charge and thence this charge through the rearwardly directed exhaust duct 106. The structure of Figure 5 is otherwise similar to Figure 3.

In all of the aforedescribed gas turbine power plants, the basic components of the power plants, namely the air compressor unit, the turbine unit, the combustion unit, the propeller drive reduction gear unit, and the auxiliary drive unit remain unchanged. The construction is such that the relative positions of these units may be interchanged as illustrated with only small changes in the remaining structure of the turbine power plant. This feature enables the same basic units to be used in different gas turbine power plants.

While I have described my invention in detail in its present preferred embodiment, it will be obvious to those skilled in the art, after understanding my invention, that various changes and modifications may be made therein without departing from the spirit or scope thereof. I aim in the appended claim to cover all such modifications.

I claim as my invention:

A gas turbine power plant for aircraft, said power plant comprising an air compressor having an annular intake duct, a turbine rotor adapted to be driven by the turbine motive fluid and drivably connected to said compressor, a speed reduction transmission unit for an aircraft propeller shaft, said transmission unit having a drive shaft adapted to be drivably connected with either end of said turbine rotor, a housing for said transmission unit, an auxiliary drive unit providing a drive for auxiliary power plant equipment, said auxiliary unit having a drive shaft also adapted to be drivably connected with either end of said turbine rotor, a housing for said auxiliary drive unit, means providing a mounting surface surrounded by the inner wall of said annular duct for supporting either of said housings with its drive shaft drivably connected to the adjacent rotor end, and means providing a similar mounting surface adjacent the other end of the turbine rotor for supporting the other of said housings with its drive shaft drivably connected to the adjacent end of said rotor.

WILTON G. LUNDQUIST.

REFERENCES CITED

The following references are of record in the file of this patent:

UNITED STATES PATENTS

| Number | Name | Date |
|---|---|---|
| 1,045,961 | de Ferranti | Dec. 3, 1912 |
| 2,238,905 | Lysholm | May 12, 1938 |
| 2,361,887 | Traupel | Oct. 31, 1944 |